United States Patent
Lan (10) Patent No.: US 11,675,041 B2
(45) Date of Patent: Jun. 13, 2023

(54) LOCATING SIGNAL INTERFERENCE USING UNMANNED AERIAL VEHICLES

(71) Applicant: T-Mobile USA, Inc., Bellevue, WA (US)

(72) Inventor: Wei-Ming Lan, Morrisville, NC (US)

(73) Assignee: T-MOBILE USA, INC., Bellevue, WA (US)

( * ) Notice: Subject to any disclaimer, the term of this patent is extended or adjusted under 35 U.S.C. 154(b) by 296 days.

(21) Appl. No.: 16/892,671

(22) Filed: Jun. 4, 2020

(65) Prior Publication Data

US 2021/0382128 A1    Dec. 9, 2021

(51) Int. Cl.
*G05D 1/00* (2006.01)
*G01S 3/04* (2006.01)

(52) U.S. Cl.
CPC ............ *G01S 3/043* (2013.01); *G05D 1/0022* (2013.01); *G05D 1/0094* (2013.01)

(58) Field of Classification Search
CPC ..... G01S 3/043; G05D 1/0022; G05D 1/0094
See application file for complete search history.

(56) References Cited

U.S. PATENT DOCUMENTS

| | | | |
|---|---|---|---|
| 6,336,035 B1 | 1/2002 | Somoza et al. |
| 7,039,017 B2 | 5/2006 | Sherlock |
| 7,254,191 B2 | 8/2007 | Sugar et al. |
| 8,023,599 B2 | 9/2011 | Tanaka et al. |
| 8,032,330 B2 | 10/2011 | Makela et al. |
| 8,836,262 B2 | 9/2014 | Wagener et al. |
| 8,902,778 B2 | 12/2014 | Bae et al. |
| 8,992,832 B2 | 3/2015 | Donnebauer et al. |
| 9,800,320 B2 | 10/2017 | Jalali et al. |
| 9,847,035 B1 * | 12/2017 | Melamed ............... G01R 23/00 |
| 9,874,625 B2 | 1/2018 | Miller |
| 9,986,440 B2 | 5/2018 | Guvene |
| 10,490,043 B2 | 11/2019 | Emmanuel et al. |
| 10,570,656 B2 | 2/2020 | Elie et al. |
| 2009/0311963 A1* | 12/2009 | Haverty ............... H04W 12/03 455/63.1 |

(Continued)

FOREIGN PATENT DOCUMENTS

| | | | | |
|---|---|---|---|---|
| CN | 106301623 | * | 1/2017 | |
| KR | 20100005349 A | * | 1/2010 | ............. G01S 13/12 |

(Continued)

OTHER PUBLICATIONS

KR20100005349A machine translation (Year: 2010).*

(Continued)

*Primary Examiner* — Anne Marie Antonucci
*Assistant Examiner* — Jingli Wang
(74) *Attorney, Agent, or Firm* — Summit Patents PC (57) ABSTRACT

An unmanned aerial vehicle (UAV) for detecting, identifying, and locating a source emitting an interfering signal is described herein. The UAV can detect wireless network site interference within a given frequency spectrum band and locate the source of the interference based on one or more signals received by one or more antennas, such as directional antennas. The one or more antennas are located on or within a main body or one or more booms of the UAV. The UAV can be flown manually (e.g., by an operator) or automatically (e.g., by a processor or preset routine).

17 Claims, 5 Drawing Sheets

(56) References Cited

U.S. PATENT DOCUMENTS

2011/0095961 A1\* 4/2011 Johansson ............. H01Q 1/246
343/893
2017/0013476 A1 1/2017 Suthar et al.

FOREIGN PATENT DOCUMENTS

| WO | 20190032581 | 2/2019 | | |
|----|---------------|---------|------|----------|
| WO | WO2019211792 | 2/2019 | | |
| WO | WO-2019079959 A1 \* | 5/2019 | ............ | H04W 24/02 |
| WO | 20190216807 | 11/2019 | | |

OTHER PUBLICATIONS

WO2019079959A1 Machine Translation (Year:2019).\*
CN 106301623 A machine translation (Year: 2017).\*
M. A. Nair and K. N. Voudouris, "Hybrid sensor and information fusion to enhance signal classification of a multi receiving system," 2018 Advances in Science and Engineering Technology International Conferences (ASET), Jun. 2018, pp. 1-6, doi: 10.1109/ICASET.2018.8376849. (Year: 2018).

\* cited by examiner

LOCATING SIGNAL INTERFERENCE USING UNMANNED AERIAL VEHICLES

BACKGROUND

Cellphones, other mobile devices, and user equipment (UE) connect to a cellular network to provide voice, text, and data services that a user can access using the UE. The UE and the cellular network communicate using radio transmissions that are sent and received through a network site, such as a cellphone tower. Other sources of radio transmissions can broadcast on a similar frequency or range of frequencies as the communications between the UE and the network site. Operating on the similar frequency or range of frequencies can cause the broadcast from the other sources of radio transmissions to interfere with the communications between the UE and the network site. This interference can prevent or disrupt radio communication between the network site and the UE, which prevents the network site from clearly receiving communications from the UE and vice versa. The disruption caused by the interference can reduce the quality of the communications between the UE and the network site, which causes voice calls to be dropped, increases packet loss(es) during data transmissions, lowers data transfer rates, and other disruptions caused by the interference. These disruptions can frustrate users as their connection to the cellular network through the UE is prevented or hindered by the interference.

To prevent or minimize the interference through mitigating actions caused by broadcasts from other radio sources, an operator of the network site like a wireless services provider must identify, detect, and locate a source of the interference. The wireless network provided uses drive testing to determine the source of the interference. Drive testing is a process by which a team of people drives around in a vehicle within a given geographical area to detect and record physical and virtual parameters of a wireless network within the geographical area. Drive testing can be inefficient and inaccurate due to a variety of factors, including, improper or inaccurate signal detection. For example, the interfering signal can bounce around, which provides an inaccurate location, due to structural impediments or obstacles. As another example, an operator can be holding an antenna improperly. These drawbacks produce inaccurate and inefficient drive testing.

What is needed is a system for more accurate and efficient detection of signal interference at wireless network sites.

DETAILED DESCRIPTION

Radio transmissions allow UEs to connect and communicate with a wireless network and to provide a user with various services, such as voice calls, text messaging, and data services. These radio transmissions are between the UE and a wireless network site, like a cellphone tower, and occur in a range of frequencies or an "operating band" of the network site. Other sources of radio transmissions can broadcast signals that are within or near the frequencies of the operating band of the network site, causing interference with the radio transmissions between the UE and the network site. This interference can disrupt communications between the UE and the network site, causing voice calls to be dropped, data packets to be lost and other communication disruptions. To detect, identify, and locate an interference source, the operator can use a system, including an unmanned aerial vehicle (UAV), to more efficiently and accurately detect, identify, and locate an interference source. By more accurately and efficiently detecting, identifying, and locating the interference source, an operator of a network site can reduce time and cost associated with signal interference detection. Furthermore, providing more accurate information about the interfering signal permits the operator or a regulatory body, such as the United States Federal Communications Commission (U.S. FCC), to more efficiently reduce or eliminate the interfering signal, such as by deactivating the interference source, requesting or proposing signal changes, or the like.

Figure 1A:
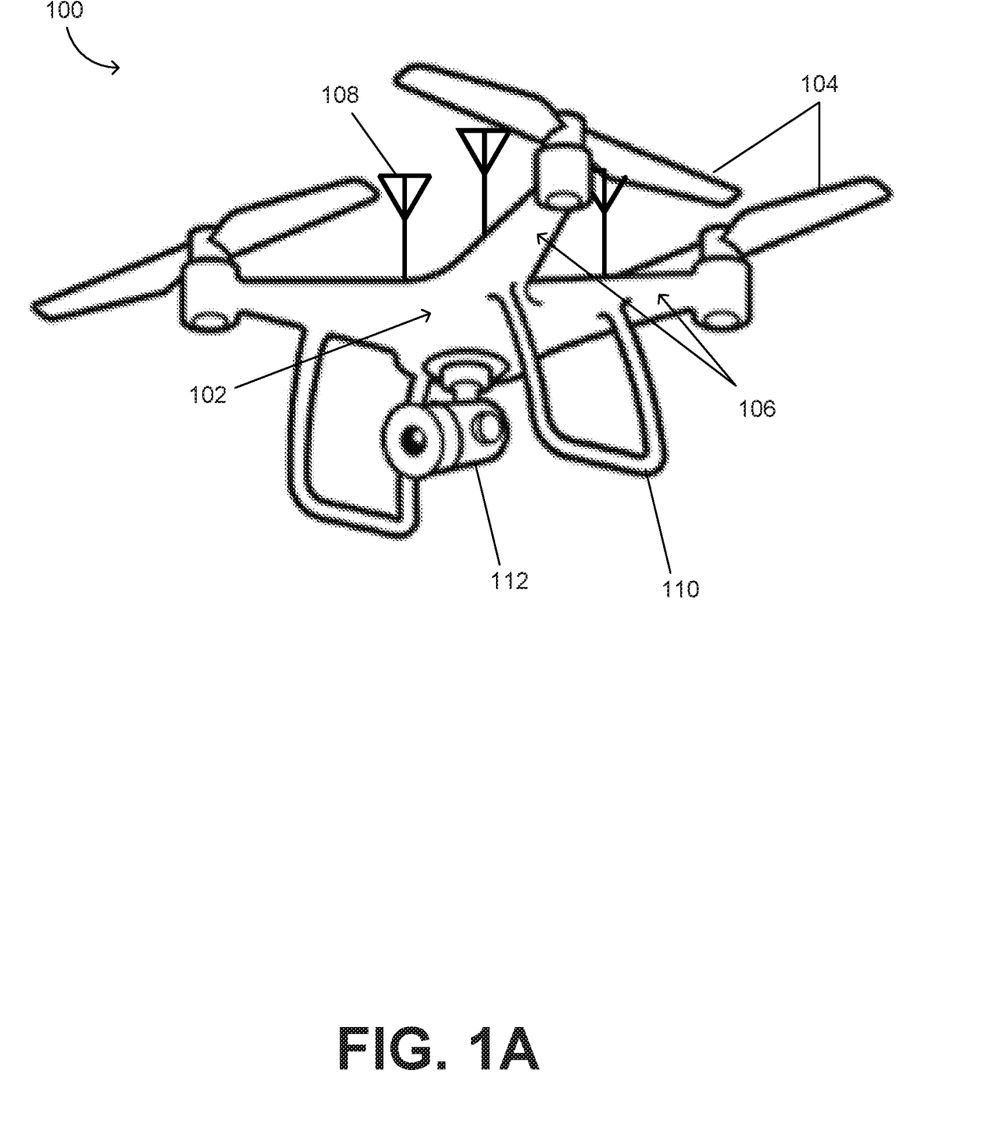
FIGS. 1A-1B illustrate an example unmanned aerial vehicle.
Figure 1B:
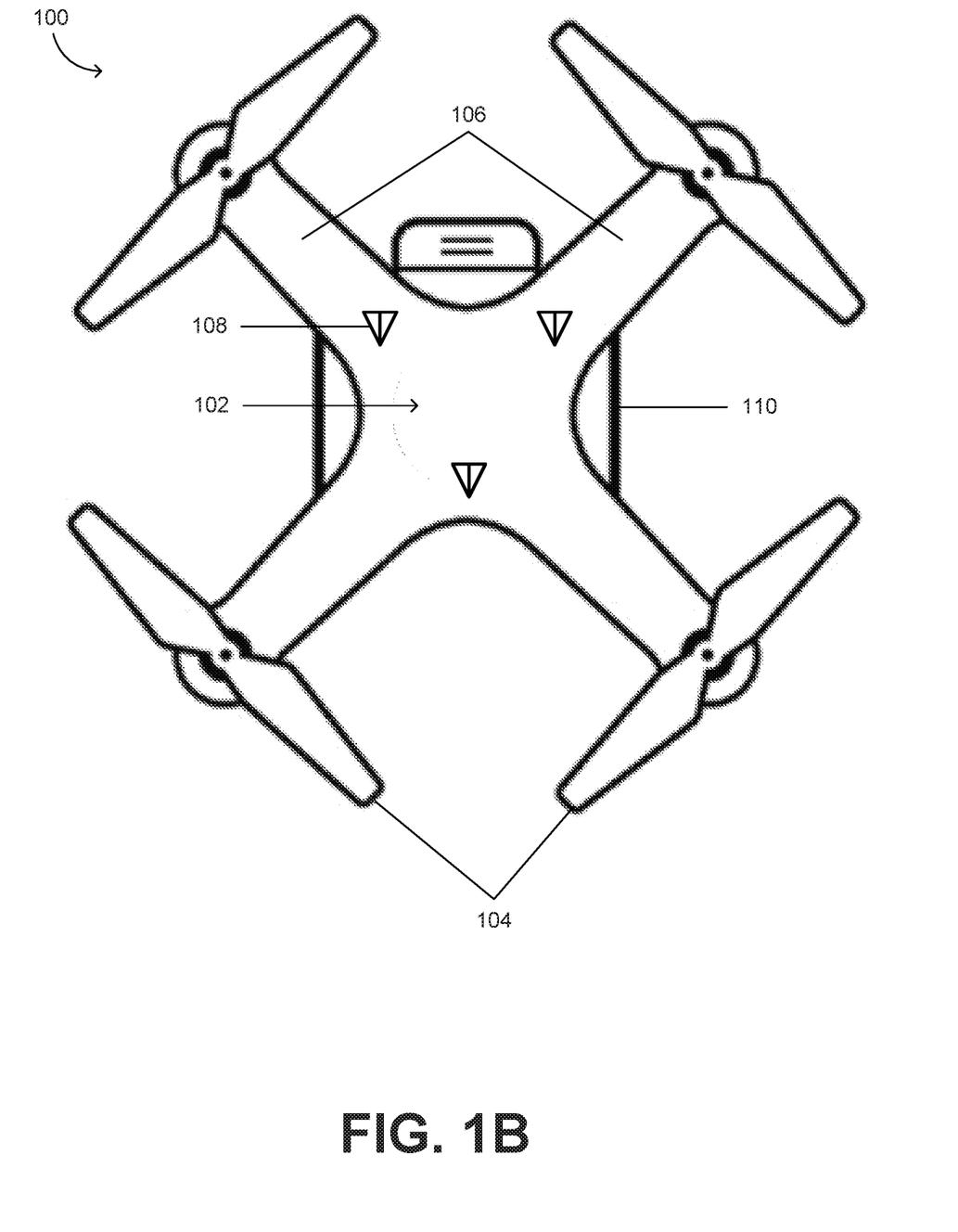
Figure 1C:
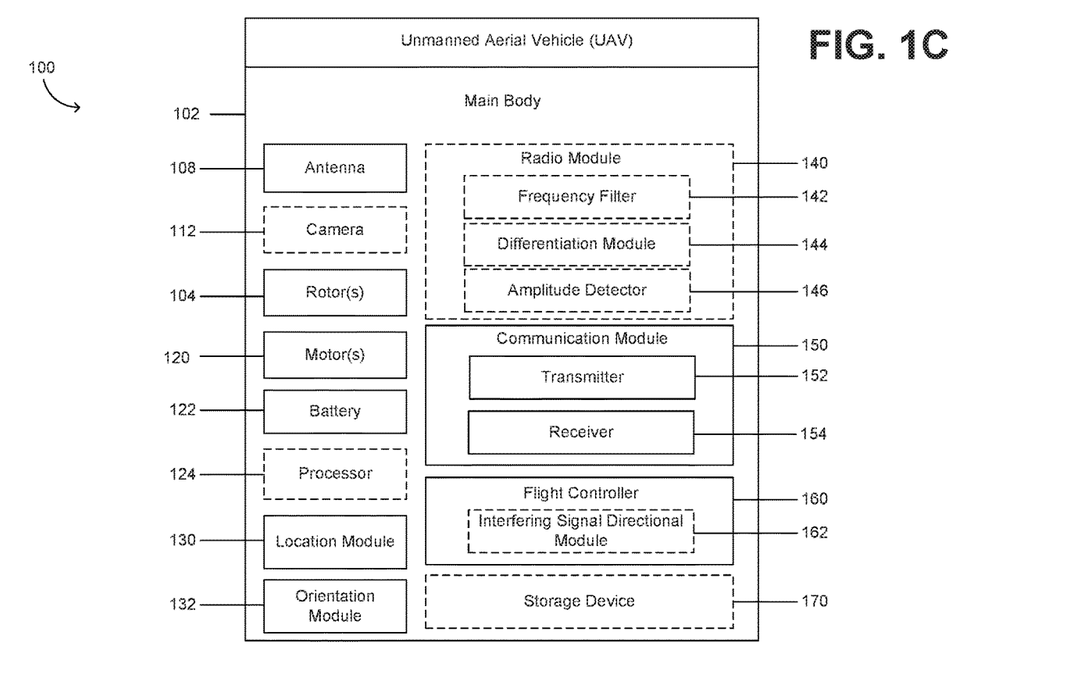
FIG. 1C illustrates a block diagram of the example unmanned aerial vehicle.

FIGS. 1A-1B show an unmanned aerial vehicle (UAV) 100 for detecting, identifying, or locating an interference source. FIG. 1C shows a block diagram of the UAV 100. The UAV 100 includes rotors 104 connected to a main body 102 via booms 106. In one example, such as when 4 rotors 104 are included, at least one of the rotors 104 is a pusher prop and at least one of the rotors 104 is a standard or "tractor" prop. The rotors 104 are driven by motors 120. An increase or decrease motor speed results in increasing or decreasing rotor speed.

The UAV 100 also includes a battery 122 to provide power to one or more components of the UAV 100. The battery 122 can be rechargeable or non-rechargeable.

The UAV 100 also includes an antenna 108. The antenna 108 can be housed within the main body 102, housed within one of the booms 106, or located on (i.e., external to) the main body 102 or one of the booms 106. Being located "on" is not limited to the antenna 106 being located on top of, and can also include being located underneath, projecting outwardly, or the like.

In one example, the antenna 108 is a directional antenna to receive a signal from a given direction. When one antenna 108 is included, and the antenna 108 is a directional antenna, the UAV 100 can be rotated to determine one or more directions from which one or more signals are being received. A directional antenna is an antenna which transmits or receives signals to or from a specific direction. The UAV 100 can then fly in the direction of the strongest interfering signal (i.e., from an unapproved source).

The UAV 100 can include multiple antennas 108. In one example, the multiple antennas 108 are each directional antennas. Each of the antennas 108 provide a minimum coverage angle (θ). Each antenna 108 points in a particular direction and measures the interfering signal (or a parameter or characteristic of the interfering signal) coming from the respective direction. The UAV 100, such as via a processor, determines which signal is strongest and the direction from which the signal came. The UAV 100 can then fly in the direction of the strongest interfering signal (i.e., from an unapproved source).

When multiple directional antennas are used, the minimum coverage angle (θ) for each directional antenna is equal to 360° divided by the total number of directional antennas. In other words, $$\text{Minimum Coverage Angle}(\theta) = \frac{360°}{\text{Total Number of Directional Antennas}}.$$

Alternatively, the maximum number of directional antennas is equal to 360° divided by the minimum coverage angle (θ) for an individual antenna. In other words, $$\text{Maximum Number of Directional Antennas} = \frac{360°}{\text{Minimum Coverage Angle }(\theta)}.$$

Figure 2A:
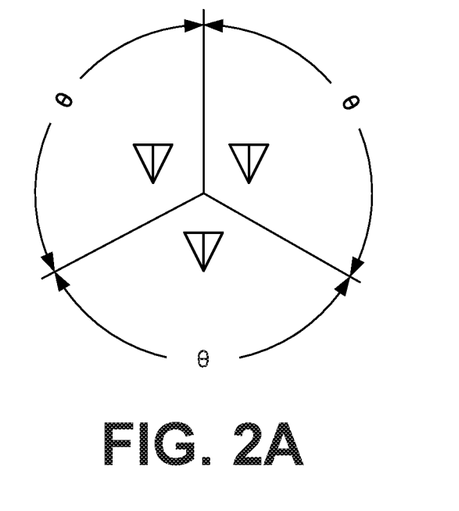
FIGS. 2A-2D illustrate directional antenna coverage.
Figure 2B:
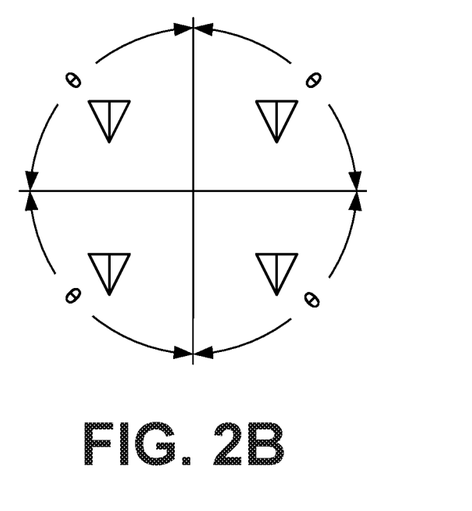
Figure 2C:
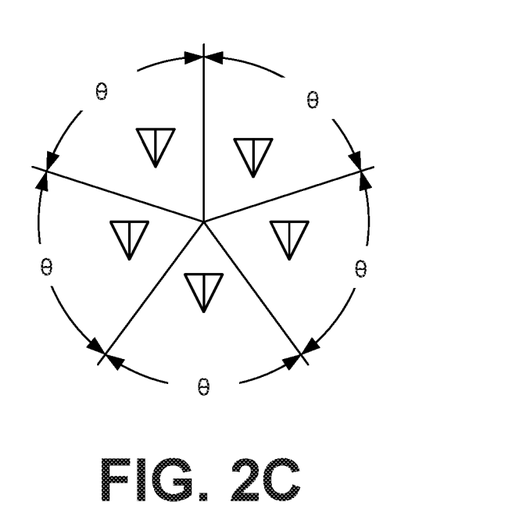
Figure 2D:
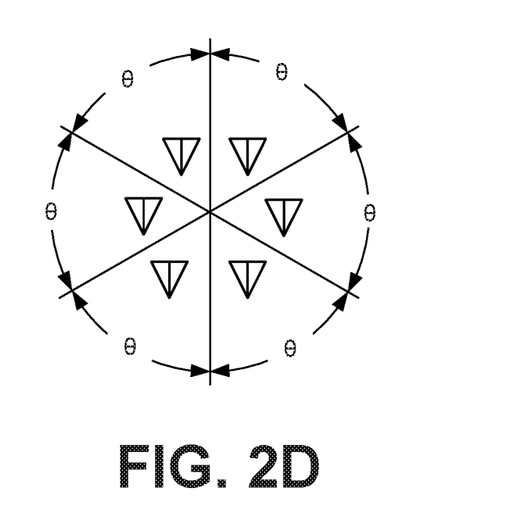

In one example, the UAV 100 includes 3 directional antennas, as shown in FIG. 2A. Each of the directional antennas has a minimum θ of 120°. In another example, the UAV 100 includes 4 directional antennas, as shown in FIG. 2B. Each of the directional antennas has a minimum θ of 90°. In yet another example, the UAV 100 includes 5 directional antennas, as shown in FIG. 2C. Each of the directional antennas has a minimum θ of 72°. In yet another example, the UAV 100 includes 6 directional antennas, as shown in FIG. 2D. Each of the directional antennas has a minimum θ of 60°.

Returning to FIGS. 1A-1C, the UAV 100 can include a camera 112 or other image capture device. The camera 112 can be stationary or can be movable along or rotatable about one or more axes (x, y, and z), such as on a gimbal. The camera 112 or other image capture device can take an image or video of the interference source or the location of the detected interference source.

The UAV 100 can also include an orientation module 132, as shown in FIG. 1C, to determine the direction to which each directional antenna is pointed or directed based on inputs received from one or more directional antennas and one or more measurement devices. The orientation module 132 can also measure and output a force, angular rate, or orientation (in or relative to one or more axes or planes) of the UAV 100 with the one or more measurement devices. In one example, the measurement device is an inertial measurement unit (IMU). In another example, one or more measurement devices are a magnetometer, a gyroscope, an accelerometer, or combinations or multiples thereof. The magnetometer measures magnetic fields and can be used as a compass (i.e. determine orientation in the North-East-South-West plane), due, at least in part, to the earth's magnetic field. The accelerometer, which measures one or more accelerations, can measure: a change in velocity since the acceleration is the first time derivative of the velocity, and a change in position, such as by integrating the acceleration signal. The accelerometer can also be used to determine orientation in the Up-Down plane. The gyroscope measures either changes in orientation or rotational velocity. The UAV 100 can also include landing gear 110. The landing gear 110 can be a post, a crossbar, a wheel, a base, a pad, the like, or combinations or multiples thereof.

The UAV 100 includes a location module 130 to determine the location of the UAV 100. The location module 130 can include global positioning system (GPS), global navigation satellite system (GLONASS), or both. In one example, information provided by the location module 130 and the orientation module 132 can be used to provide latitude, longitude, elevation, and compass heading of the UAV 100. The location and orientation of the UAV 100 can be stored or transmitted to a team to locate the interference source when detected by the UAV 100.

The UAV 100 also includes a communication module 150 to communicate with external devices. The communication module 150 can communicate with the external device by one or more wireless communication protocols, including a radio link, infrared, Bluetooth®, ad hoc networks, or WiFi. The external devices can be, without limitation, a remote control, a server, a computer, a laptop, a tablet, a smartphone, or the like. The communication module 150 includes a transmitter 152 to send or output data, a signal, an instruction, or the like to the external device. The communication module 150 includes a receiver 154 to receive data, a signal, an instruction, or the like from the external device. In one example, the transmitter 152 and the receiver 154 can be a single component, such as a transceiver. In another example, the transmitter 152 and the receiver 154 can be separate components, such as one or more antennas transmitting or receiving over different frequencies.

The UAV 100 can include a processor 124 to control one or more functions or components of the UAV 100, including power distribution. The processor 124 can initiate or implement one or sets of instructions, such as those stored within a storage device or transmitted to the UAV 100.

The UAV 100 can also include a storage device 170 to store and retain information or data including, without limitation, data or information relating to a flight, one or more received signals, one or more interfering signals, or the like. The storage device 170 can be a hard drive, such as a solid state drive. The storage device 170 can be removable. In one example, the storage device 170 can include one or more sets of instructions to detect, identify, or locate the interfering signal, one or more sets of instructions for flying towards the strongest signal from an unapproved source, or both.

Figure 3:
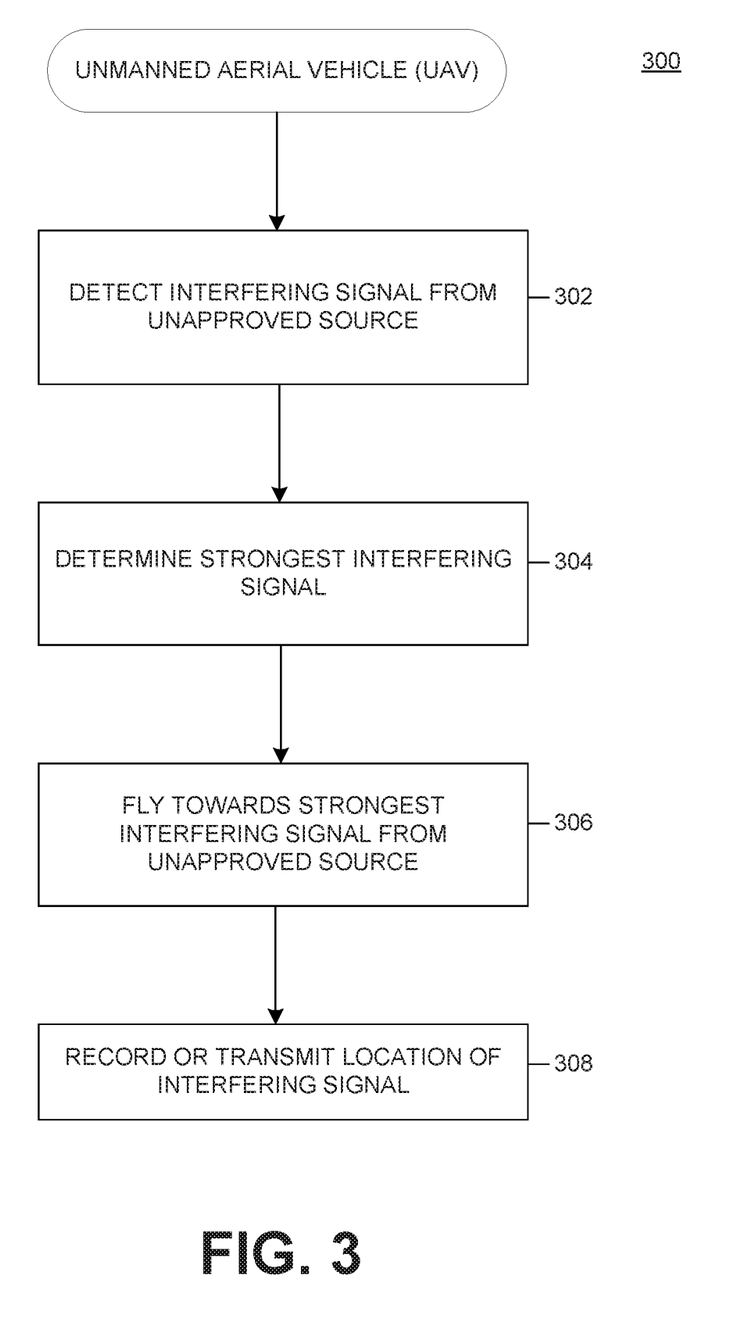
FIG. 3 illustrates an example method.

FIG. 3 shows a flowchart for detecting, identifying, and locating an interfering signal with the UAV 100. The UAV 100 is flown or directed to a network site owned, maintained, or used by an operator of the network site, like a wireless services provider. The UAV 100 is brought near or proximal to an antenna of the network site. In one example, the height of the UAV 100 is equal to the height of the antenna of the network site. In another example, the height of the UAV 100 deviates from the height of the antenna of the network site by a given percentage, including, less than 100%, equal to 100%, or greater than 100%, wherein 100% is the height of the antenna at the network site. In yet another example, the height of the UAV 100 deviates from the height of the antenna of the network site by a given amount, including, less than 1 meter, 1 meter, or greater than 1 meter.

In one example, the UAV 100 can be flown around the network site to detect all signals within a frequency spectrum or band (i.e., wireless transmission spectrum). In another example, the UAV 100 can remain stationary relative to the network site to detect all signals with the frequency spectrum or band.

At 302, the UAV 100 detects an interfering signal from an unapproved source. The interfering signal is a signal having a frequency that falls within, is adjacent to, or overlaps with a frequency spectrum or band of interest. A frequency that is adjacent to a frequency spectrum or band of interest can fall within a frequency that deviates from the frequency spectrum or band of interest by an absolute value (e.g., frequency spectrum or band of interest±1 kHz, 2 kHz, 3 kHz, 4 kHz, 5 kHz, up to 10 kHz, up to 15 kHz, up to 20 kHz, up to 100 kHz, or the like) or within a frequency that deviates from the frequency spectrum or band of interest by a given percentage (e.g., range of frequency spectrum or band of interest±1%, 2%, 3%, 4%, 5%, up to 10%, up to 99%, or the like).

One or more signals are received by the antenna. The one or more signals are then processed by a radio module 140 to detect one or more interfering signals, such as by processing the signals received by the antennas 108. The radio module 140 includes a frequency filter 142 and a differentiation module 144.

The frequency filter 142 selects the signals having a frequency that falls within, is adjacent to, or overlaps with a frequency spectrum or band of interest, while removing, disregarding, or filtering out the signals having a frequency that does not fall within, does not overlap, or is not adjacent to a frequency spectrum or band of interest. The frequency filter 142 can be a low pass filter, a high pass filter, a band-pass filter, a band-stop filter, a notice filter, or the like. In one example, the frequency filter 142 is an electrical circuit, which can be active or passive. In another example, the frequency filter 142 is a data processor which analyzes the signals computationally.

In one example, to select the appropriate signals, the frequency filter 142 can filter out frequencies that does not fall within, does not overlap, or is not adjacent to a frequency spectrum or band of interest by physically preventing the passage or transmission of the frequency outside of the desired frequency spectrum or band. For example, a capacitor in a resistor-capacitor circuit or in a resistor-inductor-capacitor circuit inhibits passage or transmission of the frequency outside of the desired frequency spectrum or band.

In another example, to select the appropriate signals, the frequency filter 142 filters out frequencies that does not fall within, does not overlap, or is not adjacent to a frequency spectrum or band of interest computationally, such as with data processing. For example, MATLAB can process the data to filter out the frequency outside of the desired frequency spectrum or band.

The differentiation module 144 determines whether a signal is from an approved source or an unapproved source. Since one or more interfering signals can come from an approved source (i.e., a source owned, maintained, or used by the operator, or a source that is regulated or must remain on for one or more reasons), those signals can be disregarded, such as to reduce the number of signals being analyzed. In one example, a signal having a known pattern (e.g., a signal coming from another network site) can be disregarded. In another example, a signal detecting from a given direction (e.g., a signal coming from another network site) can be disregarded. In yet another example, a signal coming from a known source, regardless of direction or pattern, can be disregarded.

In one example, to detect the one or more interfering signals, the received signals undergo filtering, such that any received signal that does fall within, does not overlap, or is not adjacent to the frequency spectrum or band of interest is disregarded or discarded. The remaining signals are then processed to determine whether a signal is from an approved source or an unapproved source. Signals from an approved source are disregarded or discarded, and signals from an unapproved source then undergo further processing to detect, identify, or locate the unapproved source. In another example, to detect the one or more interfering signals, the received signals are processed to determine whether a signal is from an approved source or an unapproved source. Signals from an approved source are disregarded or discarded. Signals from an unapproved source then undergo filtering, such that any received signal that does fall within, does not overlap, or is not adjacent to the frequency spectrum or band of interest is disregarded or discarded. The remaining signals then undergo further processing to detect, identify, or locate the unapproved source.

The signals from an unapproved source having frequencies that fall within, are adjacent to, or overlap with a wireless transmission spectrum are interfering signals.

The radio module 140 also includes an amplitude detector 146 to determine the amplitude or strength of a signal. Returning to FIG. 3, at 304, the remaining signals are processed by the amplitude detector 146, which can be a physical circuit or can be performed computationally, to determine the strongest remaining signal (i.e., greatest or largest amplitude or magnitude, such as in decibels).

At 306, the UAV 100 is then flown in the direction of the strongest remaining signal, as directed by a flight controller 160 of the UAV 100. The flight controller 160 can interpret input from one or more UAV 100 components or external controllers to regulate motor speeds and provide steering. The flight controller 160 can also trigger the camera 112 or other payloads. The flight controller 160 can also control autopilot, waypoints, follow me, failsafe, and other autonomous UAV functions.

In one example, as the UAV 100 rotates or flies towards the strongest remaining signal, the antenna 108 receiving the strongest remaining signal can change. The orientation module 132 and one or more other components, such as the radio module 140, the flight controller 160, and the processor 124, can determine the direction in real-time. In another example, the strongest remaining signal can be identified and a flight path can be determined. The flight path, which can be a set of instructions, directs the UAV 100 to the source.

In one example, the flight controller 160 includes an interfering signal directional module 162. The interfering signal directional module 162 receives and interprets input from one or more antennas 108, the orientation module 132, the location module 130, the radio module 140, or combinations thereof to direct the UAV 100 towards the strongest interfering signal.

At 308, once the source of the interfering signal is detected, identified, and located, such as by determining the location at which the interfering signal is the strongest, the location of the interfering source is recorded and stored or transmitted to an external device or operator. The location of the interfering source correlates to the location of the UAV 100, as determined by the location module 130 when the UAV 100 is near, proximal to, or above the interfering source.

In another example, the flight controller 160 causes the UAV 100 to be flown towards the strongest interfering signal based on input from the communication module 150 having received an instruction via a signal from an external remote control, such as used by an operator.

One or more of the processing modules of the UAV 100 (e.g., the radio module 140 and the interfering signal directional module 162) can be located in an external device. In that instance, the UAV 100 can collect any appropriate data or signals, and transmit the data or signals to one or more external devices via the transmitter 152 for data and signal processing. The external device then uses the one or more modules to process the data or signals and then transmit the results to the receiver 154 of the UAV 100. The external device can direct the UAV 100 towards the interfering signal. In this way, the UAV 100 can be part of a system for detecting, identifying, and locating the interfering source. The system can include multiple UAVs, one UAV with one or more external devices, multiple UAVs with one or more external devices, or combinations or multiples thereof.

Additionally, or alternatively, the antennas 108 can receive the interference signal. The amplitude detector 146 can determine a signal strength for the interference signal received at each of the antennas 108. The location module 130 identifies the antenna 108 that received the interference signal with the signal strength of the greatest value and the direction or location of the interference signal based on the interference signal with the signal strength of the greatest value. The interfering signal directional module 162 then directs the UAV 100 to fly in the direction of or towards the location of the interference signal.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a system including an unmanned aerial vehicle, those elements, aspects, components or the like can be including with any system including an unmanned aerial vehicle, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents:

What is claimed is:

1. An unmanned aerial vehicle (UAV) for detecting an interference source, the UAV comprising:
    multiple antennas on the UAV to receive an interference signal from the interference source, the interference signal having a frequency within, adjacent to, or overlapping a wireless transmission spectrum, wherein each of the multiple antennas produce a measured signal strength of the interference signal;
    an amplitude detector circuit to receive each of the measured interference signals and to determine the antenna that produced the greatest measured signal strength of the interference signal, wherein the direction of the interference source is indicated by the direction of the antenna that produced the greatest measured signal strength of the interference signal;
    a transmitter to output to an external computing device the direction of the interference source with respect to the direction of the antenna that produced the greatest measured signal strength of the interference signal; and
    a flight controller to receive, and to direct flight of the UAV toward, the direction of the interference source.

2. The UAV of claim 1, wherein each of the multiple antennas provides 60° of coverage.

3. The UAV of claim 1, wherein each of the multiple antennas provides 120° of coverage.

4. The UAV of claim 1, further comprising a differentiation module of a processor to:
    compare a pattern or location of the interference signal to known patterns or known locations of approved sources;
    determine, based at least in part on the comparing, whether the interference signal is from one of the approved sources or an unapproved source;
    disregard the interference signal if the interference signal is determined to be received from one of the approved source; and
    permit the interference signal to be transmitted if the interference signal is determined to be received from the unapproved source.

5. The UAV of claim 1, further comprising a circuit configured to prevent or permit transmission of the interference signal based on whether the frequency of the interference signal is within, adjacent to, or overlapping the wireless transmission spectrum.

6. The UAV of claim 1, further comprising a data processor configured to computationally determine the frequency of the interference signal.

7. The UAV of claim 1, further comprising an image capture device to take an image or video of the interference source.

8. The UAV of claim 1, further comprising an image capture device to take an image or video of a location of the interference source.

9. The UAV of claim 1, further comprising an inertial measurement unit (IMU) to determine directions or orientations of each of the multiple antennas.

10. A method for detecting an interference source, the method comprising:
    receiving an interference signal from the interference source with multiple antennas of an unmanned aerial vehicle (UAV), the interference signal having a frequency within, adjacent to, or overlapping a wireless transmission spectrum, wherein each of the multiple antennas produce a measured signal strength of the interference signal;
    determining the antenna that produced the greatest measured signal strength of the interference signal;
    determining the direction or location of the interference source based on the direction of the antenna that produced the greatest measured signal strength of the interference signal;
    outputting the direction or location of the interference source to an external computing device; and
    directing flight of the UAV toward the direction or location of the interference source.

11. The method of claim 10, further comprising:
comparing a pattern or location of the interference signal to known patterns or known locations of approved sources;
determining, based at least in part on the comparing, whether the interference signal is from one of the approved sources or an unapproved source.

12. The method of claim 11, further comprising:
disregarding the interference signal if the interference signal is determined to be received from the approved source; and
transmitting the interference signal if the interference signal is determined to be received from the unapproved source.

13. The method of claim 10, further comprising taking an image or video of the interference source.

14. The method of claim 10, further comprising taking an image or video of a location of the interference source.

15. The method of claim 10, further comprising:
when at the location of the interference source, transmitting the location of the interference source to a team of people in a ground vehicle.

16. The method of claim 10, further comprising:
when at the location of the interference source, flying around the location of the interference source to detect all signals within a particular frequency spectrum or band.

17. The method of claim 10, further comprising:
controlling the height of the UAV with respect to the height of an antenna of the interference source.

\* \* \* \* \*